July 17, 1962
D. ROSENTHAL
3,044,444
WOODEN HENS' NESTS
Filed March 23, 1961
2 Sheets-Sheet 1
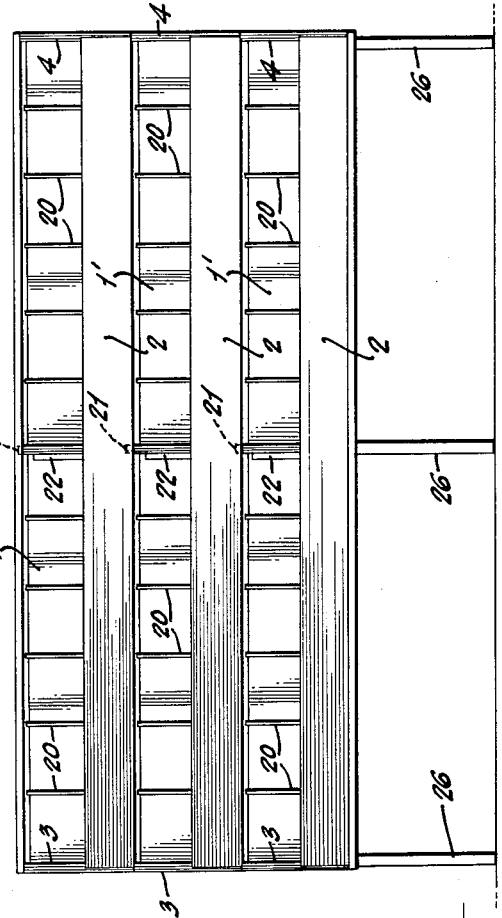
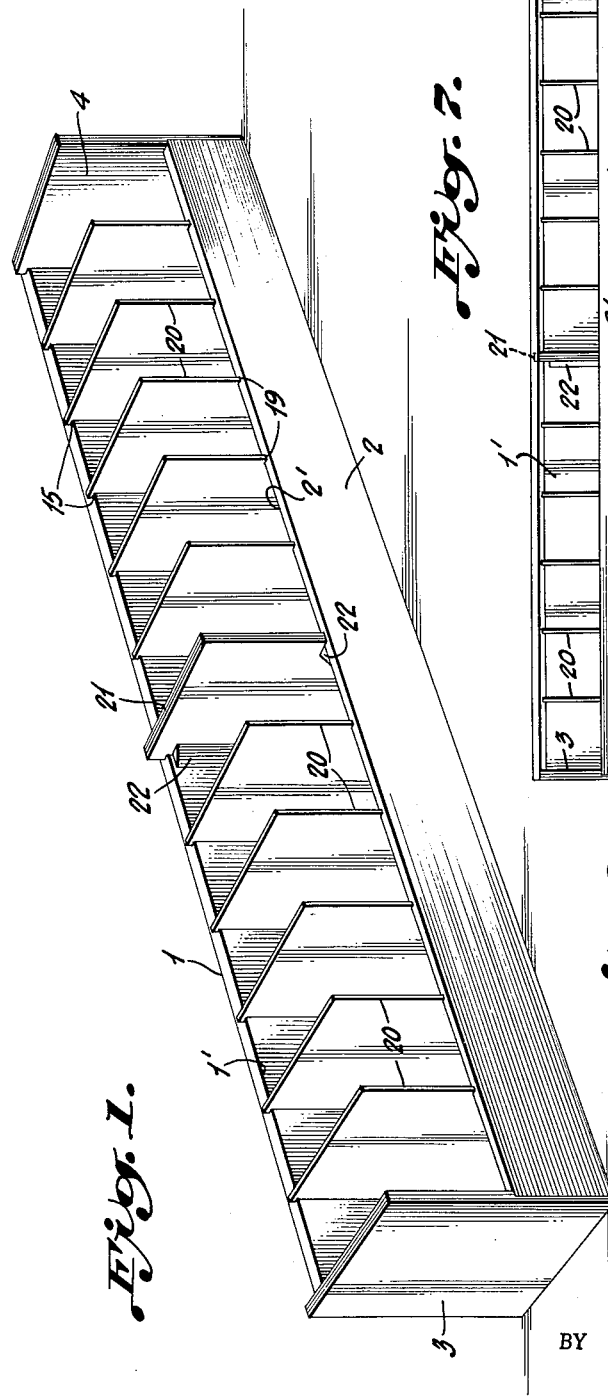
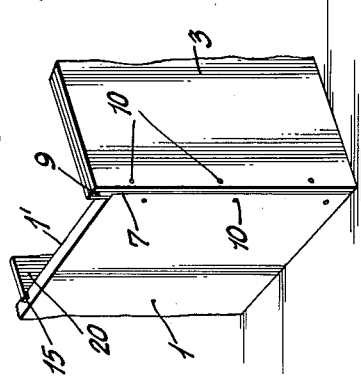
INVENTOR
DAVID ROSENTHAL
BY
ATTORNEY

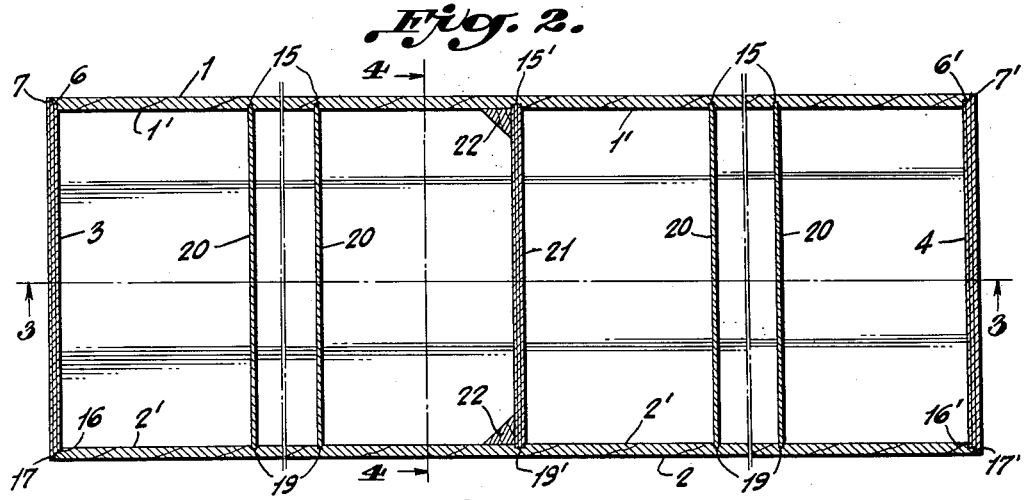
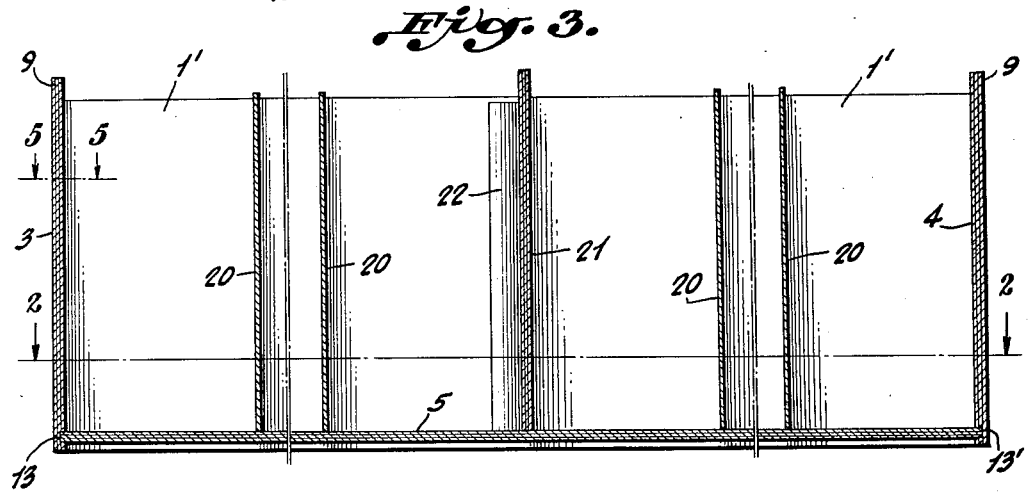
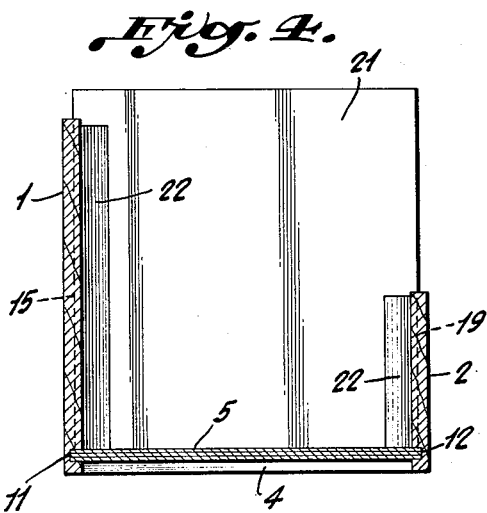
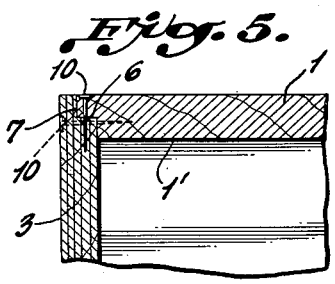
INVENTOR
DAVID ROSENTHAL
BY
ATTORNEY

United States Patent Office 3,044,444
Patented July 17, 1962

3,044,444
WOODEN HENS' NESTS
David Rosenthal, 38 Maple Ave., Ellenville, N.Y.
Filed Mar. 23, 1961, Ser. No. 97,810
8 Claims. (Cl. 119—45)

This invention relates to a hen's nest, or a poultry laying cabinet, and more particularly to such devices fabricated of wood and related products.

It is the object of the present invention to provide a hen's nest which is rugged in construction and economical in cost by virtue of the fact that the same may be fabricated from comparatively few standardized units which may be prepared in a woodworking plant, and which may be assembled quickly at the point of utilization.

It is a further object of the invention to provide a laying cabinet which may be set up easily to obtain many different capacities to conform to the lay-out of the poultry houses in which the same may be used. It is also a characteristic of the invention that the units may be periodically cleaned easily, disinfected and coated with preservatives.

When use is made of powdered litter material such as diatomaceous earth, which is costly in comparison to sawdust, excelsior, peanut shells, and other litter material, it is important that the same be conserved without loss through the cracks or crevices of the laying cabinets. By virtue of the tight joints afforded by the construction in accordance with the invention, such losses are minimized.

Other objects and purposes will appear from the following detailed description of the invention, taken in conjunction with the accompanying drawings, wherein FIG. 1 is a perspective view of one unit of the compartmented hen's nest or laying cabinet in accordance with the invention;

FIG. 2 is a horizontal sectional view across the lower part of the cabinet and along line 2—2 of FIG. 3;

FIG. 3 is a vertical sectional view of the unit along line 3—3 of FIG. 2;

FIG. 4 is a vertical sectional view along line 4—4 of FIG. 2;

FIG. 5 is a horizontal sectional view along line 5—5 of FIG. 3;

FIG. 6 is a perspective view of the right rear corner of the unit; and

FIG. 7 is a front elevation showing the mounting of three superposed units.

As shown in the drawings, the laying cabinets in accordance with the invention are formed primarily of wood materials, the standardized components of which may be prepared at low cost in a wood working shop. A unit may be assembled by two men in approximately five minutes, whereas the assembly of a metallic nest of comparable capacity requires several times that long.

Aside from the simplicity involved in the fabrication of the components, the components are capable of absorbing preservative and disinfectant compositions such as insect oil, and the unit may be dismantled periodically to enable the cleaning and disinfecting of, and the application of preservatives to the nest to maintain sanitary conditions in the nests and poultry house.

While wooden laying cabinets for poultry have been used heretofore, the instant invention is particularly concerned with a cabinet having tight joints so that modern litter material, such as diatomaceous earth, which is of various gradations, including powdery size, and which tends to become powdery upon use, is not lost from the nest as is the case with metallic cabinets and wooden cabinets of the type used heretofore.

The laying cabinets in accordance with the invention utilize plain dressed lumber such as white pine, exterior plywood, and tempered Masonite or Presdwood, in a manner to afford maximum strength, while facilitating the necessary wood working operations to fabricate the units for interconnection by a simple nailing operation. Rabbet-joints and grooves are utilized in the interconnection of the main elements in order to obtain a structure with no open cracks or crevices therein.

FIG. 1 shows the basic unit, consisting of a long rear wall 1, a front wall 2 coextensive with the rear wall, and end walls 3 and 4 interconnecting with the ends of the rear and front walls. Both the rear wall 1 and front wall 2 may be made of pine wood of ¾ inch thickness, and the end walls 3 and 4 may be made of ½ inch thick plywood, preferably of five plies.

The opposite ends of the inner face 1' of the rear wall 1 are rabbeted at 6 and 6', respectively, along the entire height thereof, and are designed to interengage with the stepped grooves or rabbets 7 and 7' in the end walls 3 and 4, which may be cut by a circular saw or a shaper from the inner faces of the rear edges. The grooves or rabbets 7 and 7' extend only to the height of the rear wall 1, which may be 12 inches in height, leaving the full thickness of the end walls at the upper edges 9 thereof (FIG. 6). Rabbets 17, 17' are cut along the inner faces of the front edges of the end walls 3 and 4, respectively, which rabbets correspond to the height of the front wall 2 which may be 6 inches, and these rabbets are designed to interengage with rabbets 16, 16', respectively, in the opposite ends of the inner face 2' of the front wall 2 (FIG. 2).

The bottom or floor of the laying cabinet may be formed by a three-ply piece of plywood ⅜ inch in thickness and somewhat more than a foot wide, which is designed to be set into grooves 11 in the rear wall, 12 in the front wall, and 13, 13' in the end walls, all of which grooves are on a common level (FIGS. 3 and 4).

The cabinet, consisting of walls 1 to 4, and a floor 5, may be interconnected by a series of nails 10 at the corners of the assembly (FIG. 6).

In order to compartmentize the cabinet into multiple stalls, the inner face of the rear wall is provided with vertical guide slots 15 spaced along the length thereof, with a slot 15' of greater width at the center. Similarly, the inner face 2' of the front wall is provided with vertical slots 19 at spaced points along the length thereof, with a wider slot 19', which slots are in alignment with the respective slots 15, 15' in the rear wall. Spacers 20, of ⅛ inch tempered Masonite presdwood are designed to be slid within slots 15 and 19 and serve to subdivide the length of the cabinet into multiple compartments. If the length of the cabinet is 8 feet, the cabinet may be divided into twelve hens' nests.

The partition 21 at the center of the unit is of more rugged and heavier construction and is preferably formed of three-ply plywood of ⅜ inch thickness, which is additionally secured in place by triangular prismatic corner reinforcements 22 at both the rear and front of the partition, which may be nailed to both the partition and front and rear walls of the cabinet.

It is to be noted that the horizontal slots 11 and 12 for seating the bottom or floor of the cabinet in the rear and front walls, respectively, are of greater depth than the vertical slots 15 and 19, (FIG. 4), in order to afford a break-joint at the base of the cabinet, which enhances the tightness of the cabinet against loss of powdered material therefrom. Such connections supplement the rabbet-joints between the corner elements of the cabinet.

The unit of FIG. 1 may be mounted upon legs 26, which are adapted to rest on the floor of the poultry house, and several units may be arranged in tiers, as shown in FIG. 7, to increase the quantity of hens' nests in a given floor area of a building, or they may be hung from ceiling beams. In either of these cases, the top edge of the intermediate partition 21 of all units except the uppermost one extends about ⅜ inch above the end walls of the cabinet, and is keyed into the inside grooves of the bottom edges of the front and rear walls of the laying cabinet thereabove, to provide a stable structure. The uppermost cabinet may be covered by a top which may be formed of a plank of plywood of the same construction as the end walls 3 and 4.

In order to afford maximum strength to the unit, the grain of the exposed plies of the top may run lengthwise of the cabinet, while the grain in the exposed plies of the floor and end walls run in a direction transverse to the length of the cabinet.

In the illustrated embodiment, the rear wall of the cabinet has been indicated as one foot in height, or twice the height of the front wall. In some layouts, where access to the nests is desired from both the front and rear of the units, the heights of both the rear and front walls may be the same, or approximately six inches in height. Of course, the lengths of the laying cabinet may be varied, and in some cases lengths of four feet may fit better within the dimensions of a poultry house.

The open space between fronts and backs of each tier and the space thereabove to the bottom of the next superposed tier of nests, serve to provide cross-ventilation.

The components of the cabinets may be sprayed with preservative and/or disinfectant before assembly, and this may be supplemented following assembly, and periodically after the cleansing of the nest. This cleansing may be executed easily by removing the Masonite presdwood dividers or partitions from between the front and rear walls.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A wooden hen's nest formed with permanently connected tight joints between four vertical walls and a horizontal floor panel to preclude loss of powdery bedding material through cracks or crevices, comprising a long wooden continuous vertical front wall, a long wooden continuous vertical rear wall of the same length as said front wall, vertical side walls extending between the opposite ends of said front and rear walls and provided with vertical stepped rabbet grooves along the inwardly facing opposed ends thereof, the inner faces at the ends of said first-mentioned front and rear walls having vertical rabbet grooves to accommodate the respective stepped ends of the side walls, and thereby to form rabbet-joints between the front, rear and side walls, said front, rear and side walls having grooves on a common level in their inner faces adjacent to the bottom edges thereof, a floor panel seated within said last-mentioned grooves, said front and rear walls having a plurality of aligned vertical guide slots in the inner faces thereof, and removable vertical partitions slidable within said vertical slots to subdivide the nest into individual compartments.

2. A nest as set forth in claim 1 wherein the front wall of the nest is of lesser height than the rear wall to facilitate access to the compartments therein.

3. A nest as set forth in claim 1 wherein the aligned vertical guide slots in the front and rear walls include a pair of greater width than the others at the midportion of said walls, and a plywood partition seated within said wider slots.

4. A nest as set forth in claim 3 wherein said vertical partitions are of tempered artificial fiber-board.

5. A nest as set forth in claim 3 wherein said plywood partition is affixed to the front and rear walls with the aid of prismatic wooden blocks of triangular cross-section.

6. A nest as set forth in claim 5 wherein said partition extends above the level of the remainder of the nest for interlocking engagement with the bottom of a nest disposed thereabove.

7. A nest as set forth in claim 3, including a top wooden panel for covering said compartments extending over and between the upper edges of said side walls.

8. A nest as set forth in claim 7 wherein said front and rear walls are of plain lumber sheets, the side walls, center partition, floor panel and top panels are of plywood, and the vertical intermediate partitions are of tempered artificial fiber-board.

References Cited in the file of this patent

UNITED STATES PATENTS

| | | |
|---|---|---|
| 1,447,882 | Parpfrey | Mar. 6, 1923 |
| 1,603,461 | Harlacher | Oct. 19, 1926 |